Oct. 29, 1968 L. KEHNE 3,407,639

DEVICE AND METHOD FOR FORMING HELICAL TUBING

Filed Oct. 29, 1965 6 Sheets-Sheet 1

INVENTOR
LOTHAR KEHNE

BY McGlew & Toren
ATTORNEYS.

DEVICE AND METHOD FOR FORMING HELICAL TUBING

Filed Oct. 29, 1965 6 Sheets-Sheet 2

INVENTOR
LOTHAR KEHNE

BY McGlew & Toren
ATTORNEYS.

DEVICE AND METHOD FOR FORMING HELICAL TUBING

Filed Oct. 29, 1965 6 Sheets-Sheet 3

INVENTOR
LOTHAR KEHNE

BY Mc Glew & Toren
ATTORNEYS.

INVENTOR
LOTHAR KEHNE

BY
McGlew & Toren
ATTORNEYS.

DEVICE AND METHOD FOR FORMING HELICAL TUBING

Filed Oct. 29, 1965 6 Sheets-Sheet 5

INVENTOR.
LOTHAR KEHNE

BY McGlew & Toren
ATTORNEYS.

DEVICE AND METHOD FOR FORMING HELICAL TUBING

Filed Oct. 29, 1965

INVENTOR
LOTHAR KEHNE

BY McGlew & Toren
ATTORNEYS.

United States Patent Office 3,407,639

Patented Oct. 29, 1968

3,407,639

DEVICE AND METHOD FOR FORMING HELICAL TUBING

Lothar Kehne, Rheinhauser Str. 15, Rumeln-Kaldenhausen, Germany

Filed Oct. 29, 1965, Ser. No. 505,666
Claims priority, application Germany, Oct. 31, 1964, K 54,418
11 Claims. (Cl. 72—135)

ABSTRACT OF THE DISCLOSURE

A device for forming both conical and cylindrical tubes by bending and winding a continuous strip into the desired configuration includes a first roller stand having means for separately mounting each end of an upper first roller shaft and a lower second roller shaft. The first roller stand is also mounted on a base for movement in a direction perpendicularly to the axis of the roller shafts. A second roller stand is provided for mounting each end of a third roller shaft and this roller shaft may be moved vertically upwardly and downwardly and may also be moved with its stand toward and away from the first and second roller shafts. A feature of the construction is the adjustability of all of the roller shafts in substantially all directions in order to facilitate the forming of the desired radius cylindrical tube or to provide for a conical tube formation. The first shaft is advantageously supported on an overhanging portion of the shaft so that it may be tilted in order to vary the axial position of the individual roller elements on the shaft in respect to the lower second roller shaft and in order to form the conical tubes. Each roller shaft advantageously carries a ball bushing which may slide along the shaft with the requirements for the configuration of the tube to be formed. Each of the ball bushings provide a mounting for rings which may be tilted about an axis extending perpendicular to the shaft for orientation at the desired tilt angle at which the rings may be secured in position. A table for the infeed strip of metal material is mounted so that the angle of approach to the first and second rollers for the feeding of the material to be formed into a tube therebetween may be varied.

This invention relates in general to the construction of tube-forming machines and to a method of forming a tube, and in particular to a new and useful machine for the production of cylindrical and conical tubes of different diameters from a strip which is bent and wound helically and to a novel arrangement of bending rollers therefor.

The invention relates to a machine for the production of spirally wound pipes or tubes having seams. Such machines operate by feeding a plane strip into the machine in a flat and oblique manner. The machine includes rollers which act to deform or bend the sheet in a helical manner. The spiral seams which are formed by bending the sheet in this manner are then welded together. The deformation of the strip is effected by means of at least three separate bending rollers. Machines of this nature must fulfill several requirements which are partly contradictory in nature. The feed conditions, that is, the conditions under which the strip enters the machine, must be very exact and precise so that the rims of the helical strip become situated closely adjacent each other and do not overlap or point in opposing directions. In order to produce satisfactory tubes, no friction should occur in the longitudinal direction of the tube in order to spare and protect the tube surfaces and to reduce the wear of the rollers and the energy expenditures. It is also desirable that a machine of this nature makes it possible to produce either small or large diameter tubes without material alterations of the machine. Such a machine can also have means for insuring the initial bending and feeding of the strip material to form the tube before it is acted upon by the bending rollers.

No machines of the above type have the various means for solving the above problems in a satisfactory manner. Such machines as do exist require relatively large constructional expenditures in respect to the different elements such as roller baskets which surround the entire tube, levers, rod mechanisms, spindle guides and the like.

In accordance with the present invention, there is provided a machine which operates satisfactorily in each of the situations indicated above and is of simple and inexpensive construction and which may be operated to produce either conical tubes or cylindrical tubes of either small or large diameter without material alterations and without significant increase in expenditure.

In accordance with the invention, the tube-forming machine includes at least three separate bending roller means or groups, the groups each including bending rollers mounted on a common shaft. The feeding means for the strip which is to be bent into the tube is advantageously arranged at an angle to the shafts carrying the bending rollers. The construction advantageously includes a fixed mounting for a shaft for a lower bending roller group but with the rollers mounted on a shaft for axial adjustment thereon.

A further shaft for an upper bending roller group above the lower stationary set is adjustably mounted at least for movement in a vertical direction. Such adjustment is necessary for accommodating for the various thicknesses of strip materials which are to be employed for forming the tube. A third group of bending rollers is arranged to act on the exterior of the sheet to be bent and is advantageously mounted for horizontal and vertical adjustment.

A further feature of the invention is the individual construction of each of the bending rollers. They advantageously include an annular roller member which is mounted on a ball-shaped formation on the roller shaft so that they may be adjustably positioned thereon. The roller elements are adjustable obliquely in respect to the shaft axis and the strip material which is to be acted upon. The oblique positioning of the roller elements in respect to the movement of the incoming strip prevents any gliding of the strip or tube being formed relative to the rollers and insures that feeding remains always at the same area.

Consideration of the thickness of the sheet metal being bent is obtained by a simple vertical adjustment of the interior or first group of bending rollers while the bending radii and thus the tube diameter are determined by a vertical and horizontal adjustment of a third roller group, namely the exterior roller group. None of the adjustments adversely influences the feeding conditions for the strip. The leading end of the strip may be prebent by means of a third group of being rollers while the first and second roller groups may be held on chains.

It has been found possible with the invention to form tubes in the range of 300 to 3000 mm. outer diameter with seams which are later welded. If it is desired to form tubes of greatly varying diameters with the same rollers, then the diameter of the bending roller elements is determined by the smallest tube diameter, since the upper inner bending roller must project into the tube of the smallest diameter. The dimensions of the upper bending rollers or bending roller groups, including the shaft or carrier, is limited by such circumstances. Therefore, there is a danger that during the formation of particularly strong-walled tubes, the bending rollers which are limited in respect to their diameters, will not uniformly bear against the tubes. However, with the inventive concept the upper bending rollers are mounted on a shaft which may be biased or pre-tensioned downwardly so that the rollers carried thereon will engage the interior of the strip being formed into a tube with downward pressure.

A further feature of the invention is the mounting of the third roller group which acts on the exterior of the strip to be formed so that the shaft may be inclined for the purpose of forming conical tubes. In the production of such conical tubes, the diameter increases steadily and thus also the angle of the incoming strip must be constantly changed. Thus, the incoming feeding arrangement for the inventive machine includes means for sensing the angular infeed change for the strip and for displacing the third group of bending rollers so that they will act satisfactorily to form the ever increasing diameter of the conical tubular formation.

For many different reasons the strips which come from the rolling plant and which are designed for production of tubes are not always completely planar, or even, but rather extend in a flat arc formation (referred to as a saber or sword form). Such formation influences the feed angle of the strip into the machine. Thus, the tendency is to change the tube diameter or otherwise the strip edges will overlap or the distance between the strip edges will be too large in order to effect a proper welding. Thus, according to a further modification of the invention a sensing device is provided on the incoming feed situated directly adjacent the area of formation and in the vicinity of the driving unit which shifts the third group of bending rollers in order to accommodate any sheet variations.

A significant advantage of the invention is that the forming device is usable for all known welding processes, for example for covered electric arc welding, for the application of a single welding seam for protective gas welding, for the high frequency welding, or for resistance welding. In welding the strip edges with a single welding seam, for example by high frequency welding, the forming processes advantageously are reversed so that the strip is wound downwardly instead of upwardly. In this reversed forming process the lower bending roller must always be mounted in an overhanging manner. No welding supports for the covered electric arc welding or the pressure rollers for the high frequency welding or resistance welding are required with the inventive device. If for example, the covered electric arc welding process is used, then one of the rollers which is rotatably mounted on the bending rollers is placed onto the welding point and thus serves as a welding support. If a high frequency process is used and two rollers lie above each other, that is, one inner and one outer roller, which serve as pressure rollers.

If tubes of very small diameter are to be produced, then the bending rollers including their carriers should occupy a space as small as possible.

According to a further modification of the invention, this is obtained by mounting the roller elements on ball-shaped formations on the roller shaft so that the roller elements may be arranged in any desired oblique position relative to the stationary axis of the shaft.

Accordingly, it is an object of the invention to provide an improved tube-forming machine which includes at least three roller groups, including a first stationary lower roller group and a second upper roller group which is adjustable at least in a vertical direction, and further including a third roller group which acts on the exterior of the sheet to be formed into a tube and which is mounted for movement in vertical and horizontal direction.

A further object of the invention is to provide a machine for bending strip material to form a continuous spirally wound tube which includes a lower roller group having individual roller elements thereon which may be adjustably mounted in a selected position obliquely in respect to the sheet to be fed thereto, and an upper roller group which is mounted in an overhanging manner to extend into the tube formation being formed, and with a third roller group acting on the exterior of the sheet forming it into a tube which is mounted for vertical and lateral adjustment.

A further object of the invention is to provide a tube forming machine which includes means for feeding a sheet of metal to three sets of rollers, two of which are mounted in alignment and between which the sheet material is fed, with means for sensing the direction of feed to the bending rollers, which sensing means includes means for controlling the position of a third group of bending rollers which acts on the exterior of the sheet to be bent at a location spaced laterally from the first two roller groups.

A further object of the invention is to provide a method of forming a sheet into a tube using three sets of rollers comprising directing the sheet between two vertically aligned sets of roller groups obliquely thereto while the third roller group is acting to bend the sheet inwardly to form a spirally wound tube, sensing the angle at which the sheet material is fed to the bending rollers, and thereafter correcting the position of the third roller group acting on the exterior of the sheet which is being fed.

A further object of the invention is to provide a bending roller including a shaft with axially displaceable ball elements upon which are adjustably mounted roller ring elements.

A further object of the invention is to provide an apparatus for forming tubes which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 1:
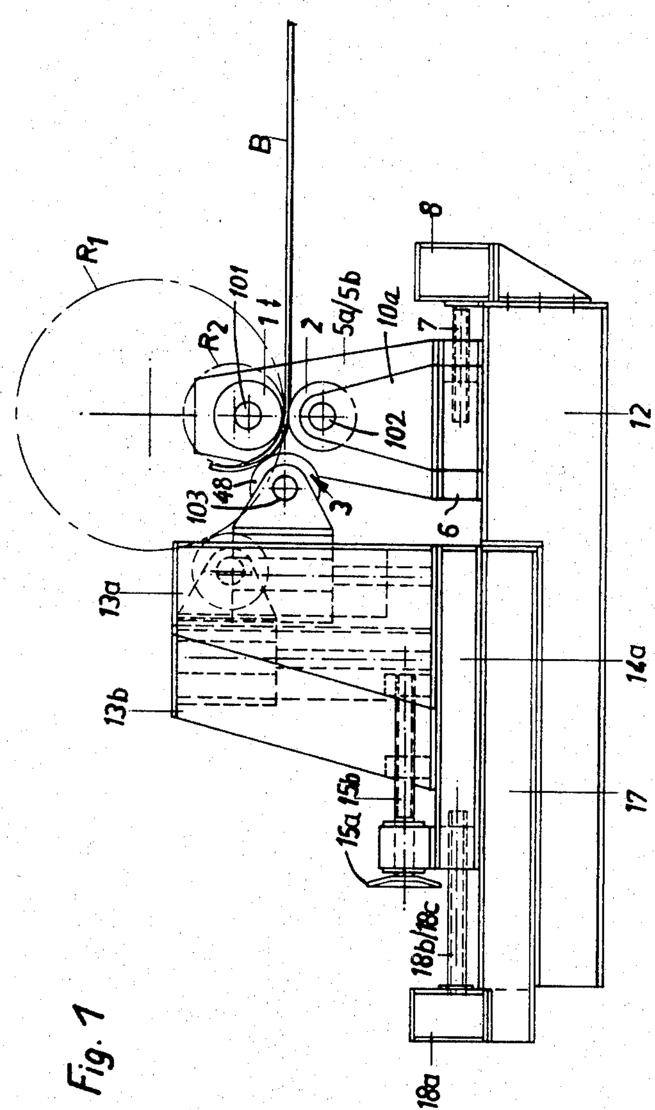
FIG. 1 is an end elevational view of a tube-forming machine constructed in accordance with the invention.

Referring to the drawings in particular, the invention embodied therein comprises a machine for feeding a strip of sheet metal material B into association with bending roller means for forming the strip into a continuous tube having spiral seams which are subsequently welded. As indicated in FIG. 1, a strip B is fed between a first roller group 1 and a second roller group 2 carried on shafts 101 and 102, respectively. The lower roller group shaft 102 is stationarily mounted in stands **10*a* and 10*b*, with intermediate supporting stand elements 10*c* and 10*d* arranged at selected locations along the length thereof (see FIG. 3). The stands 10*a* and 10*b* advantageously hold the shaft 102** in a fixed horizontal and vertical position so that entry for the feeding of the strip B is always the same.

In accordance with the invention, the shaft 101 for the upper roller group 1 is advantageously provided with a smooth bore overhanging portion **101*a* which is supported between two end pedestals or stands 5*a* and 5*b*. The stands 5*a* and 5*b* are advantageously mounted at spaced locations at each end of a mounting base or base plate 6 which, in turn, is mounted on a carrier base 12 for movement backwardly and forwardly. The base plate 6 with the stands 5*a* and 5*b* may be moved in directions toward and away from a third roller group 3 by actuating a motor control 8 driving a spindle 7 which is threaded into the base plate 6 and which will thereupon be displaced on the carrier base 12**.

Figure 2:
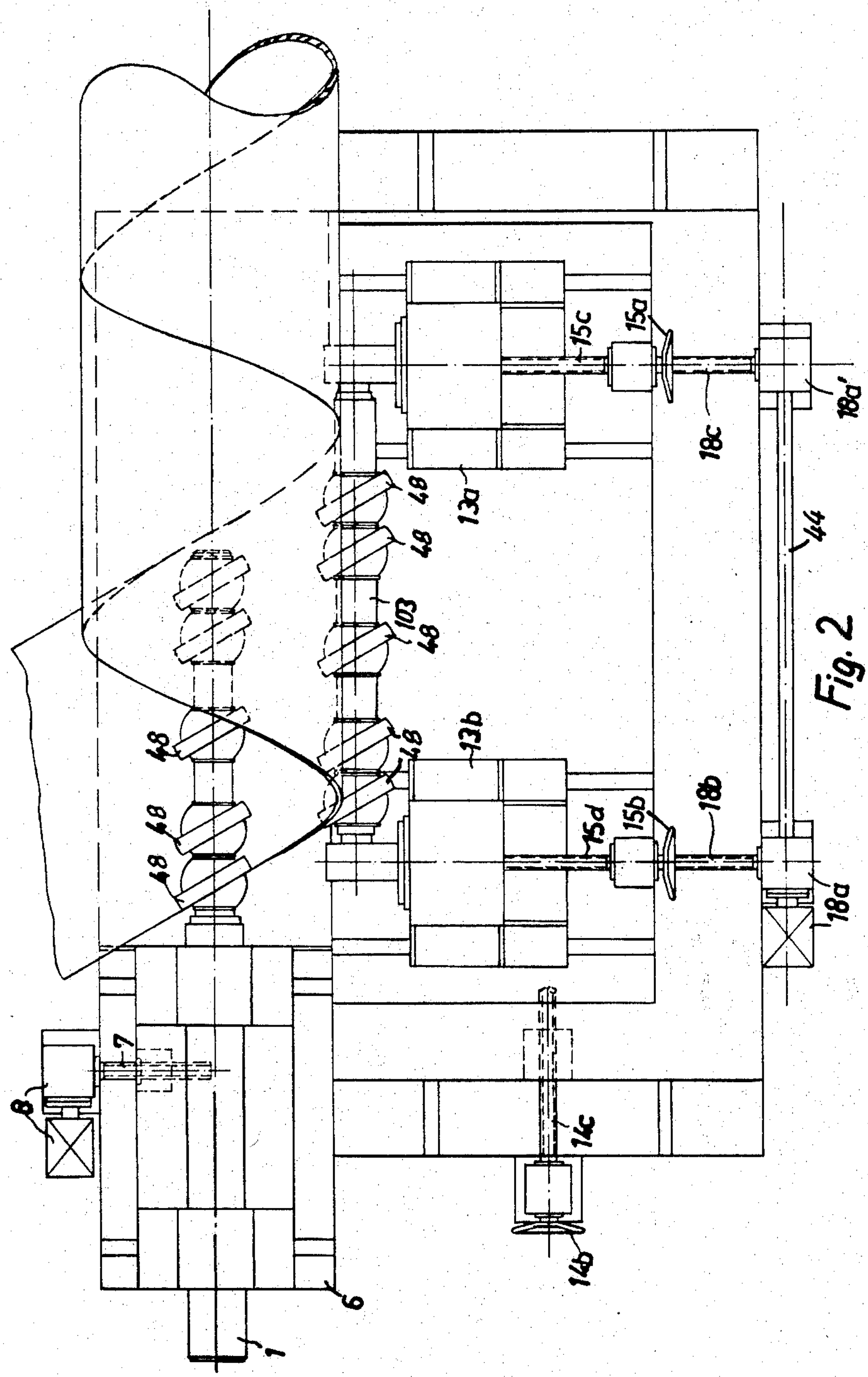
FIG. 2 is a top plan view of the machine indicated in FIG. 1.
Figure 4:
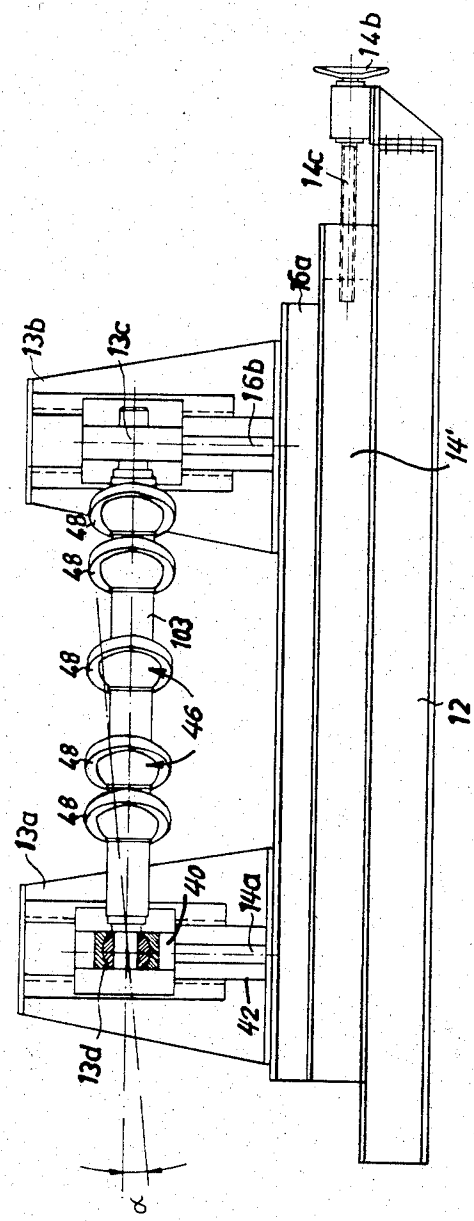
FIG. 4 is a side elevational view of the third or exterior bending shaft and mounting therefor.

A feature of the invention is that tubes may be formed to a small diameter or to a large diameter and they may be made cylindrical or conical. If tubes of a small diameter are to be rolled, as shown, for example in dotted lines by the designation $R_2$, then the rear roller group or exterior roller group 3 is arranged as indicated in solid lines in FIG. 1. The shaft 103 for the exterior roller group 3 is rotatably mounted in stands 13*a* and 13*b* which are movable toward and away from the roller groups 102 and also axially in respect thereto. As best seen in FIGS. 1, 2 and 4, the ends of the shafts 103 for the exterior roller group 3 are journalled in bearing blocks 13*d* and 13*c* which are displaceable vertically under the control of a moving piston 40 which reciprocates in a cylindrical portion 42. Suitable control fluid is admitted to the cylinder 42 for the purpose of shifting the piston 40 with the bearing blocks 13*b* or 13*c* to changing the height of the shaft 103 as well as for changing the angle of disposition (angle $\alpha$) thereof (see FIG. 4).

The stands 13*a* and 13*b* are mounted at spaced locations on a top stand 14*a* which, in turn, is displaceable on an intermediate stand 17 which in turn is also displaceable, but in an opposite direction, on a carrier stand 12. In order to effect axial shifting of the two stands 13*a* and 13*b* together, a hand wheel 14*b* is turned to rotate a threaded spindle 14*c* which engages in a sub-base portion 14' to shift the stands together in an axial direction (see FIGS. 2 and 4).

A further adjustment may be made in respect to the position of shaft 103 toward or away from the rollers of groups 1 and 2 by adjusting hand wheels 15*a* and 15*b* for rotating spindles 15*c* and 15*d*, respectively, in order to shift the stands 13*a* and 13*b* toward and away from the rollers of groups 1 and 2. An automatic control for shifting the shaft 103 is also provided which includes electrically controlled motors 18*a* and 18*a'* arranged at each end of a connecting spindle member 44. The control members 18*a* and 18*a'* are connected electrically to control means 19 (to be described hereafter) for the in-feeding of the sheet to be formed into a tube in order to provide for the proper alignment of the shaft 103 for bending purposes whenever there is any shifting in alignment of the sheet which is being fed.

Figure 5:
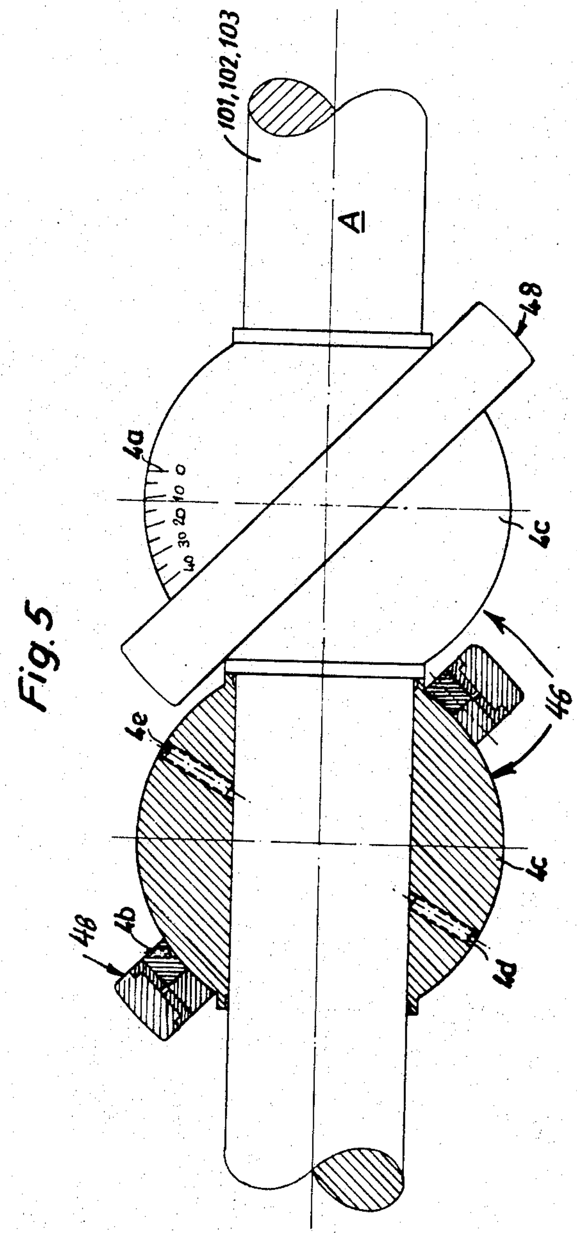
FIG. 5 is an enlarged fragmentary partial elevational and partial sectional view of a stationary roller shaft having two roller elements.

In accordance with a further feature of the invention, each of the shafts 101, 102 and 103 is constructed as indicated in FIG. 5 with a cylindrical shaft portion A over which are rotatably positioned ball members or ball bushings generally designated 46. The ball members 46 may be displaced along the shaft A and arranged at any desired location or spacing thereon and they are anchored in position by tightening set screws 4*e* and 4*d* arranged at substantially diametrically opposite locations and which are threaded inwardly to engage the shaft A. Rotatably mounted on the ball elements 46 are bending roller elements generally designated 48. The roller elements 48 may be positioned at a desired angle in relation to the axis of the shaft A, as indicated by the scale 4A defined on the exterior surface of the ball members 46. After positioning is effected, the roller members 48 are anchored in position such as by tightening set screws 44*b* which engage with the surface of the ball bushings 46.

If two tubes of large diameter, for example having a radius $R_1$, are to be formed, then the shafts 103 with the roller elements 48 are arranged in the dotted line position indicated in FIG. 1. The adjustment in height of the bearing blocks 13*d* and 13*c* for the shaft 103 may be made by actuating the piston 40. The adjustment as to spacing away from the shafts 101 and 102 may be made by actuating the hand wheels 15*a* and 15*b*.

Figure 3:
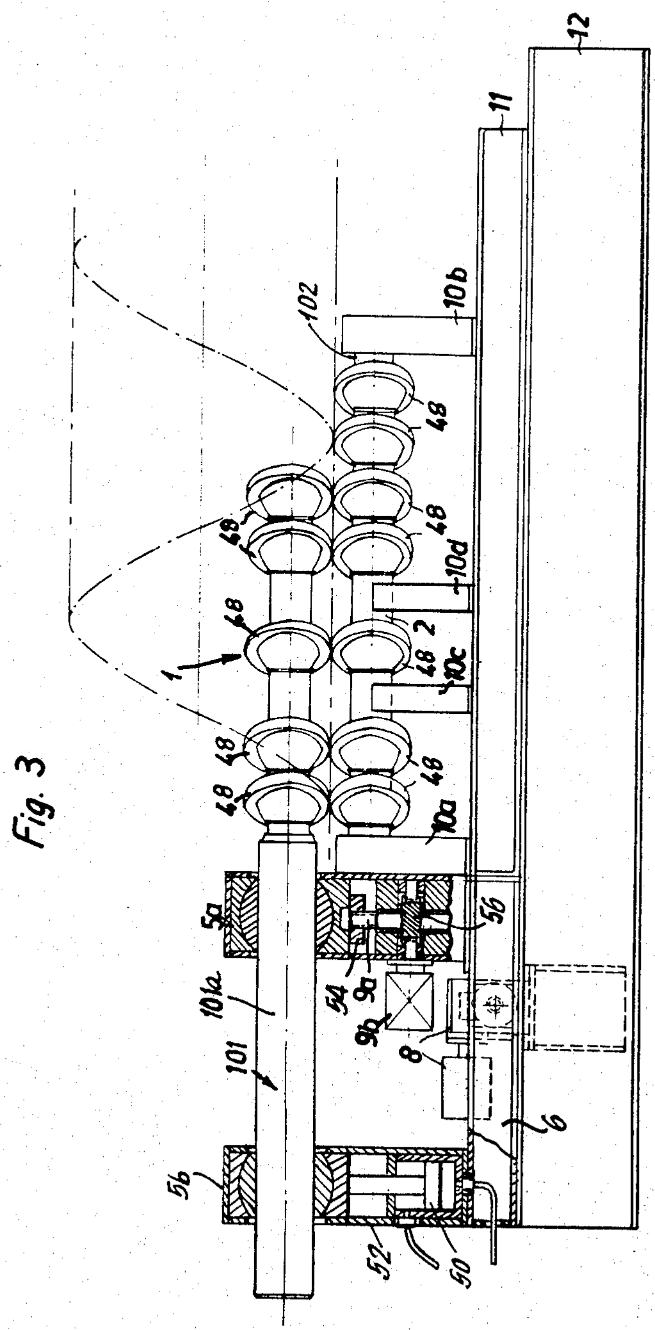
FIG. 3 is a side elevational view of the machine of FIG. 1.

As indicated in FIG. 3, the shaft 101 for the bending roller group 1 is mounted in an overhanging manner on the stands 5*a* and 5*b*. The stand 5*b* is advantageously provided with a piston 50 which reciprocates within a cylindrical portion 52 under the control of the control fluid admission (not shown) in order to provide an upward biasing pressure on the outward end of the shaft 101 and a downward biasing pressure on the roller elements 48 which engage with the elements 48 of the shafts 102. In addition, the stands 5*a* and 5*b* include bearing blocks 54 (only the one in stand 5*a* being illustrated) which are vertically displaceable and which may be displaced by driving motor 9*b* driving through a helical gear 56 and a spindle 9*a* to advance the blocks 54 either upwardly or downwardly for changing the elevation of the shaft 101. This must be done in order to accommodate for variations in thickness of the plate which is being fed to the machine.

The stands 10*a*, 10*b*, 10*c* and 10*d* for the shaft 102 are arranged on a common stand 11 which is shiftable on the carrier stand 12 (FIG. 3). When conical tubes are to be formed, it is necessary that the shaft 103 be mounted for the adjustment of its angle of inclination, as indicated in FIG. 4. By shifting the pistons 40 actuating each of the bearing blocks 13*b* and 13*c*, the desired angle $\alpha$ at which the shaft is to be oriented may be arrived at.

Figure 6:
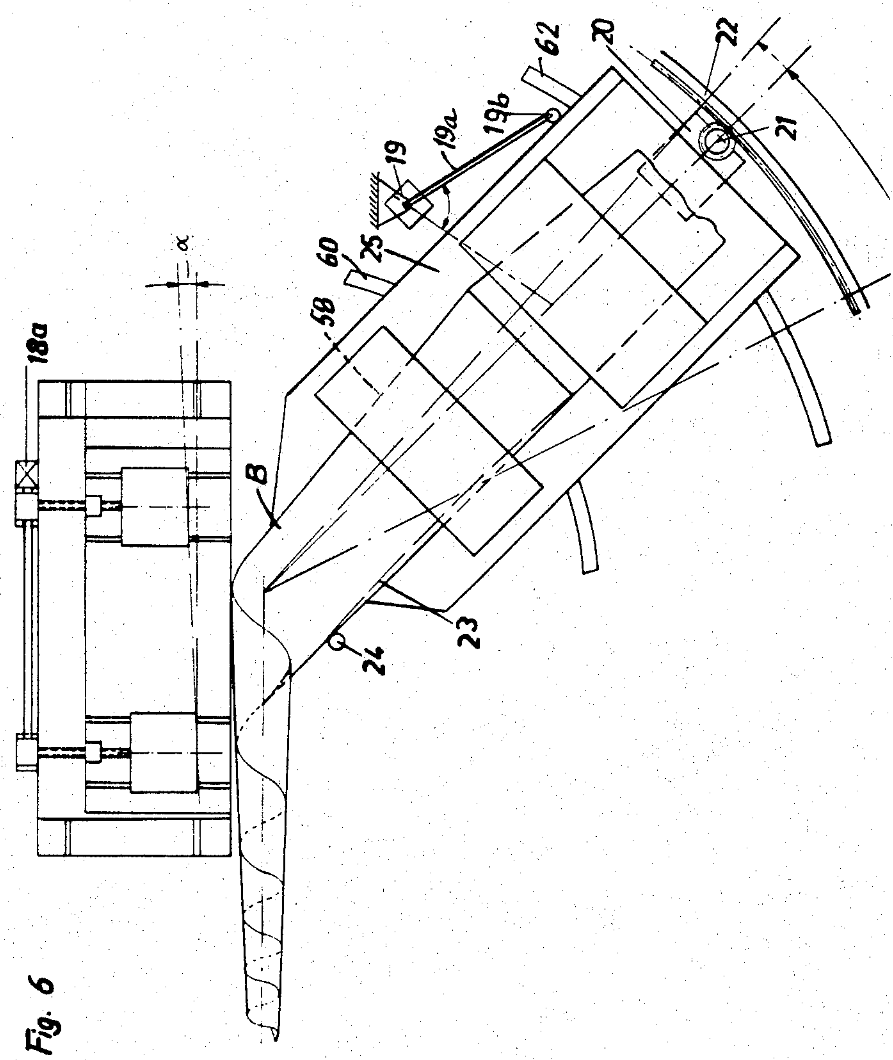
FIG. 6 is a partial plan view on a reduced scale indicating the feeding control for the sheets to be formed into tubes.

As indicated in FIG. 6, there is provided a table 25 which is mounted on pedestals for displaceable arcuate movement in slits 60 and 62. Movement of the table is effected by rotation of a gear member 21 carried on the table which drives through an arcuate rack member 22 for accurately positioning the center line of the table feed in respect to the rollers of each of the three groups. In the production of cylindrical tubes, table 25 will remain substantially stationary. However, if the strip is not linear but slightly bent or has a saber or sword form, then the table is swung so that the strip, in spite of the saber form, will always enter the machine at an angle originally determined. The control for the shifting of the table 25 includes a sensing means 24 located to bear along the edge 23 of the strip B being fed. An electrical control (not shown) is connected to the sensing means 24 and to the means for rotating the spindle 21 in order to effect the necessary shifting movement of the table 25 in the event of any misalignment.

In the production of conical tubes, the feed or inlet angle of the strip B must be constantly changed. This can be accomplished by a similar control of the drive for the spindle 21. However, in addition, the location of the third roller group 3 must be advanced with a constant angle $\alpha$ corresponding to the increasing diameter of the tube axis as it is being formed. In a particularly simple manner, this is accomplished by means of a sensing means 19 which includes a pivotal control arm 19*a* having a sensing element 19*b* at its outer end which rides along the edge 58 of the strip B. Corresponding to the movement of the strip B, the drive 18*a*, which is electrically controlled by the sensing means 19, actuated to cause a suitable shifting of the shaft 103 in accordance with the changing diameter of the conical tube being formed.

While a specific embodiment of the invention has been shown and described in detail to illustrate the application of the inventive principles, it will be understood that the invention may be embodied otherwise without departing from such principles.

What is claimed is:

1. A tube-forming apparatus for forming both cylindrical and conical tubes by bending and winding a continuous strip helically, comprising first upper roller means, second lower roller means arranged in substantial vertical alignment with, but spaced from said first roller means to receive a tube-forming sheet therebetween, third roller means located adjacent said first and second roller means in a position to bend the tube-forming sheet from the exterior, stand means mounting said first upper roller means and said second lower roller means permitting vertical movement of said first upper roller means relative to said second lower roller means, and means mounting said third roller means for tilting movement and horizontal and vertical movement relative to said first upper roller means and said second lower roller means.

2. A tube-forming apparatus comprising first upper roller means, second lower roller means arranged in substantial vertical alignment with but spaced from said first roller means to receive a tube-forming sheet therebetween, third roller means located adjacent said first and second roller means in a position to bend the tube-forming sheet from the exterior, and means mounting said third roller means for horizontal and vertical movement, said first second and third roller means including a rotational shaft, a plurality of ball-shaped members carried on said shaft arranged along the axis thereof, and a roller member angularly adjustably rotatably positioned on said ball members.

3. A tube-forming apparatus according to claim 2, wherein said ball members are slidable axially along said shaft, and means for anchoring said ball members in a fixed adjusted position on said shaft.

4. A tube-forming apparatus according to claim 2, including means on said ball member for indicating the angular position of said roller element in respect to the axis of said shaft.

5. A tube-forming apparatus according to claim 1, wherein said first upper roller means includes a shaft, means rotatably supporting said shaft adjacent one of its ends, said shaft having a plurality of roller elements at its opposite end located in alignment with the roller means of said second lower roller means.

6. A tube-forming apparatus according to claim 5, including means for biasing the opposite end of said shaft with said roller elements downwardly toward said second lower roller means.

7. A tube-forming apparatus according to claim 1, wherein said third roller means includes a roller shaft, and means supporting said shaft at each end for permitting separate vertical adjustment of each end.

8. A tube-forming apparatus according to claim 7, wherein said means supporting said shaft at each end includes a support stand, a block vertically movable in said stand, and piston means connected to said block for shifting said block vertically.

9. A tube-forming apparatus according to claim 1, including a table means for feeding a sheet to be formed into a tube toward said first, second and third roller means, said table means being mounted for arcuate movement for changing the angle of feed of said sheet to said roller means.

10. A tube-forming apparatus according to claim 9, wherein said table means for feeding a sheet to be formed towards said roller means includes a table pivotally mounted adjacent the end nearest said first upper roller means and said second lower roller means for arcuate movement toward and away from said first upper and said second lower roller means, a rotatable gear on said table for shifting said table arcuately, and an arcuate rack member engaged with said gear and to said table and being rotatable by said gear to shift said table.

11. A roller construction for the rollers for forming bending tubes, comprising a bending shaft, a ball member having a hollow bore positioned on said shaft with the shaft extending through said bore and being rotatable therewith when anchored in respect thereto, means on said ball member for anchoring said ball member at a selected location along the length of said shaft, a roller member comprising an annular ring rotatable on said ball and adapted to be positioned at a selected angle, and means for anchoring said roller member at the selected angle on said ball.

References Cited

UNITED STATES PATENTS

| | | | |
|---|---|---|---|
| 1,929,415 | 10/1933 | Force | 228—17 |
| 2,179,389 | 11/1939 | Turner et al. | 72—145 |
| 2,729,180 | 1/1956 | Freeze | 72—145 |
| 3,192,749 | 7/1965 | Eckhardt | 72—49 |
| 3,208,138 | 9/1965 | Eckhardt | 72—17 |
| 3,210,980 | 10/1965 | Sengel | 72—135 |
| 3,269,005 | 8/1966 | Smith et al. | 219—62 |
| 3,269,162 | 8/1966 | Fay | 72—145 |

FOREIGN PATENTS

| | | |
|---|---|---|
| 830,504 | 3/1960 | Great Britain. |
| 905,027 | 9/1962 | Great Britain. |
| 922,054 | 3/1963 | Great Britain. |

CHARLES W. LANHAM, *Primary Examiner.*

A. RUDERMAN, *Assistant Examiner.*